United States Patent
Mohseni et al.

(10) Patent No.: US 6,516,360 B1
(45) Date of Patent: Feb. 4, 2003

(54) METHOD AND APPARATUS FOR BUFFERING DATA TRANSMISSION BETWEEN PRODUCER AND CONSUMER

(75) Inventors: Jafar Mohseni, San Diego, CA (US); Brian Butler, La Jolla, CA (US); Deepu John, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/406,172

(22) Filed: Sep. 23, 1999

(51) Int. Cl.[7] .............................................. G06F 13/00
(52) U.S. Cl. .......................... 710/52; 710/20; 710/33; 710/53; 710/54; 710/55; 710/56; 710/60; 711/111; 711/113
(58) Field of Search ........................... 710/20, 33, 52, 710/53, 54, 55, 56, 60; 711/111, 113

(56) References Cited

U.S. PATENT DOCUMENTS

| | | | | |
|---|---|---|---|---|
| 5,555,391 A | * | 9/1996 | De Subijana et al. | 711/113 |
| 5,652,916 A | * | 7/1997 | Murakami et al. | 710/52 |
| 5,890,202 A | * | 3/1999 | Tanaka | 711/111 |
| 6,038,644 A | * | 3/2000 | Irie et al. | 711/141 |
| 6,434,678 B1 | * | 8/2002 | Menzel | 711/156 |

* cited by examiner

Primary Examiner—Jeffrey Gaffin
Assistant Examiner—Mohammad Farooq
(74) Attorney, Agent, or Firm—Nicholas J. Pauley; Philip R. Wadsworth; Charles D. Brown

(57) ABSTRACT

A need to store data between a producing stage and a consuming stage commonly arises in digital processing applications. However, factors such as fabrication process limitations and circuit area constraints may restrict the amount of available storage. A novel method and apparatus for data buffering are disclosed which use less data storage than would be required by double buffering techniques.

31 Claims, 14 Drawing Sheets

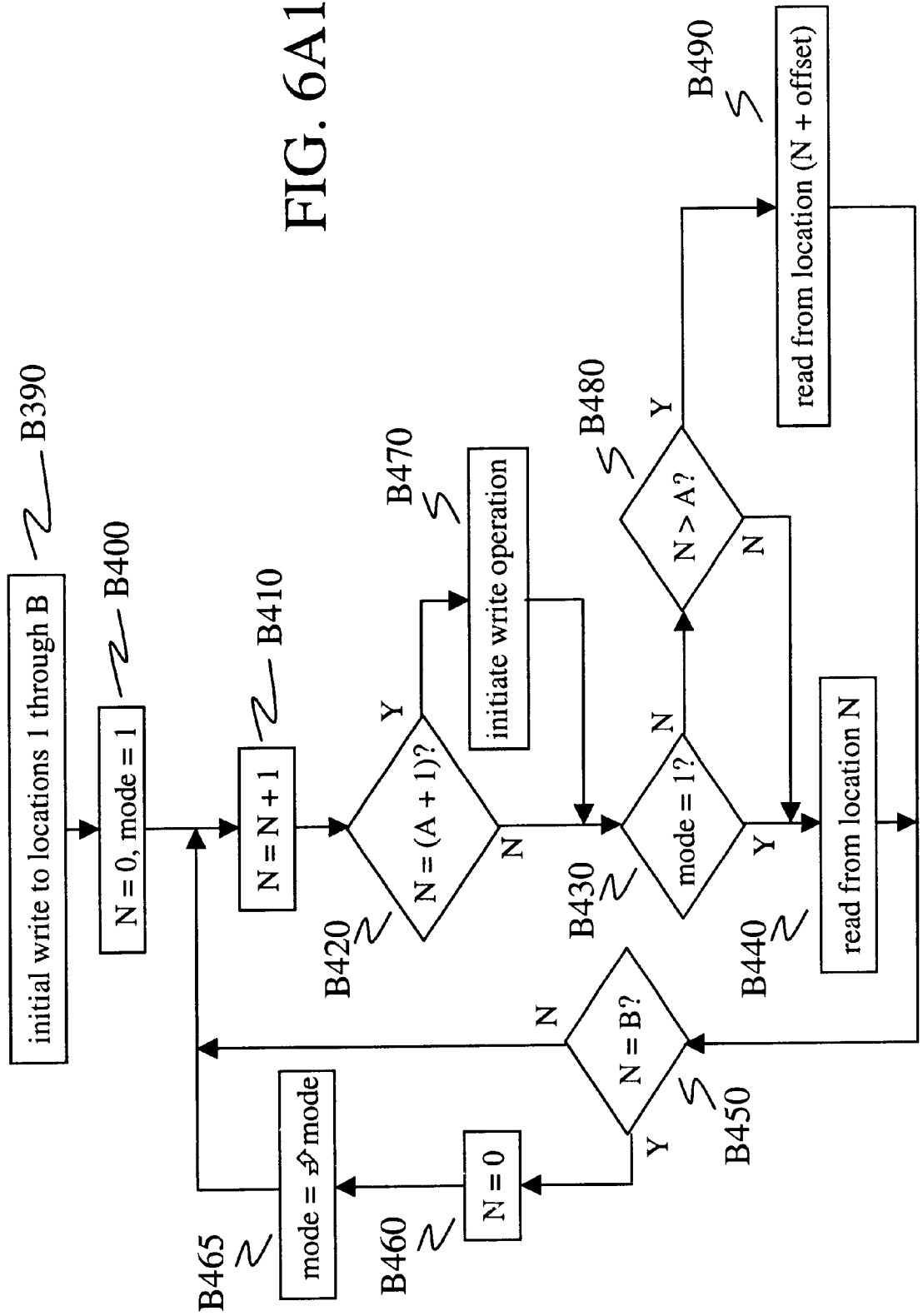
FIG. 6A1

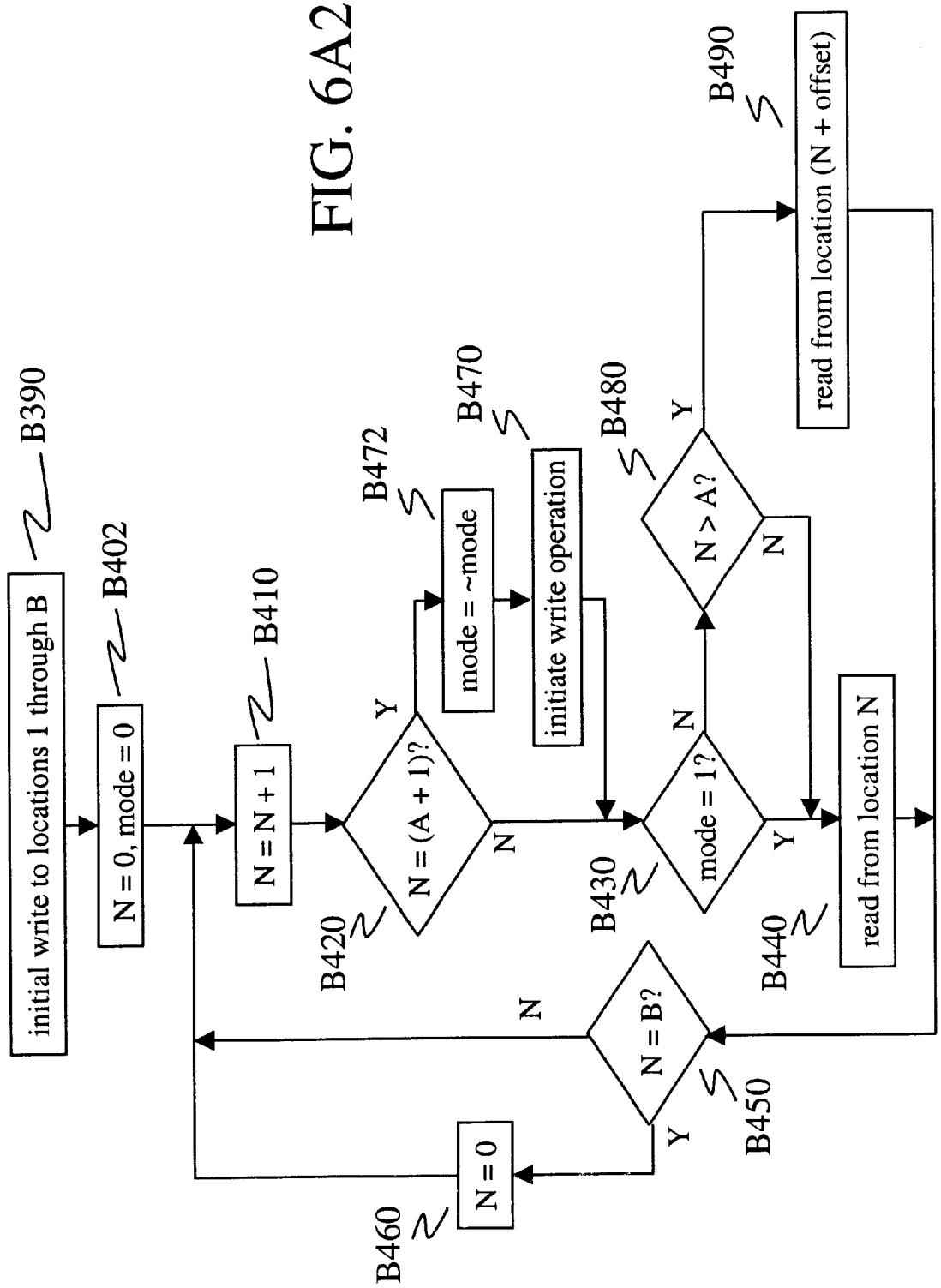
FIG. 6A2

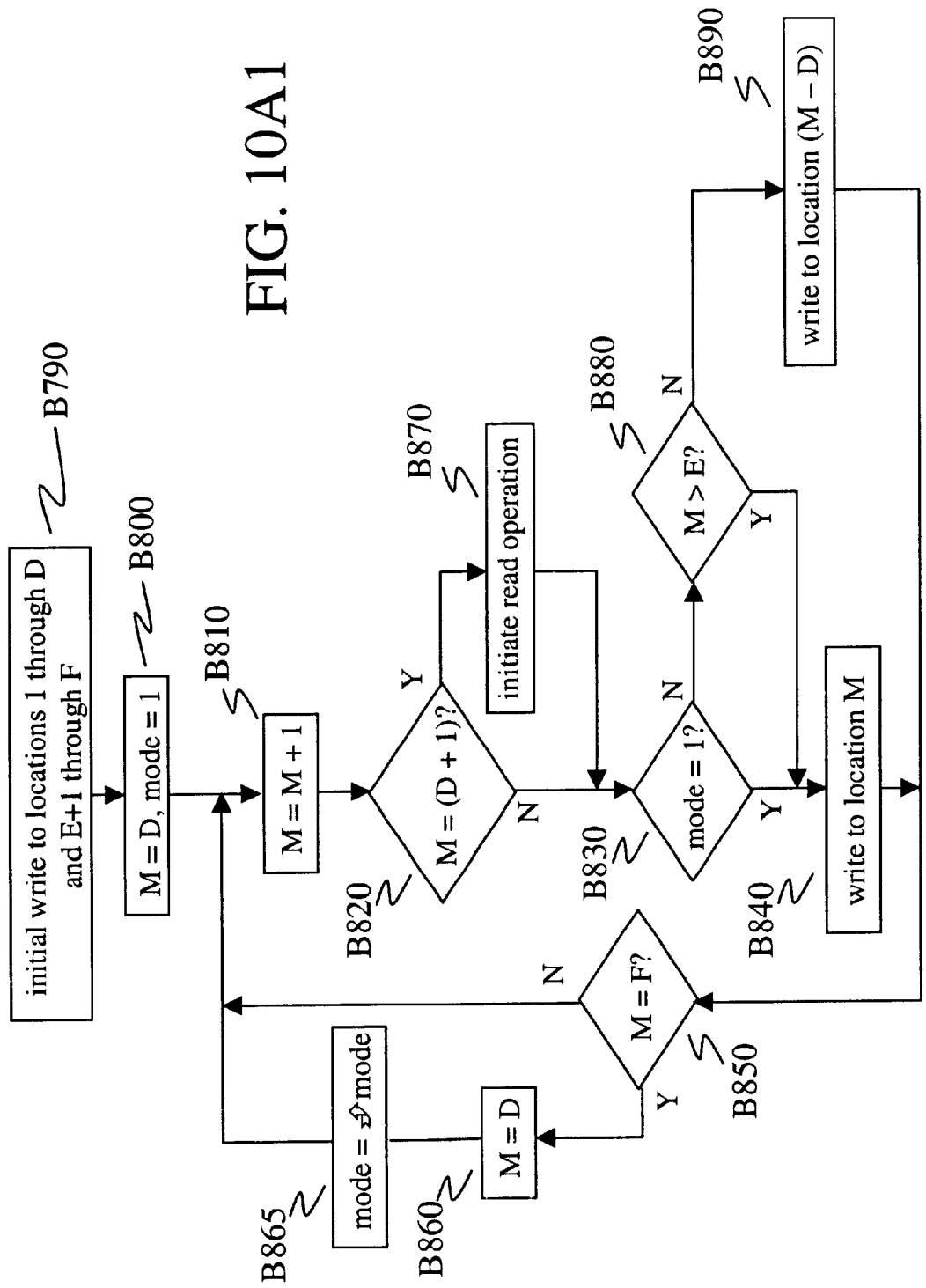
FIG. 10A1

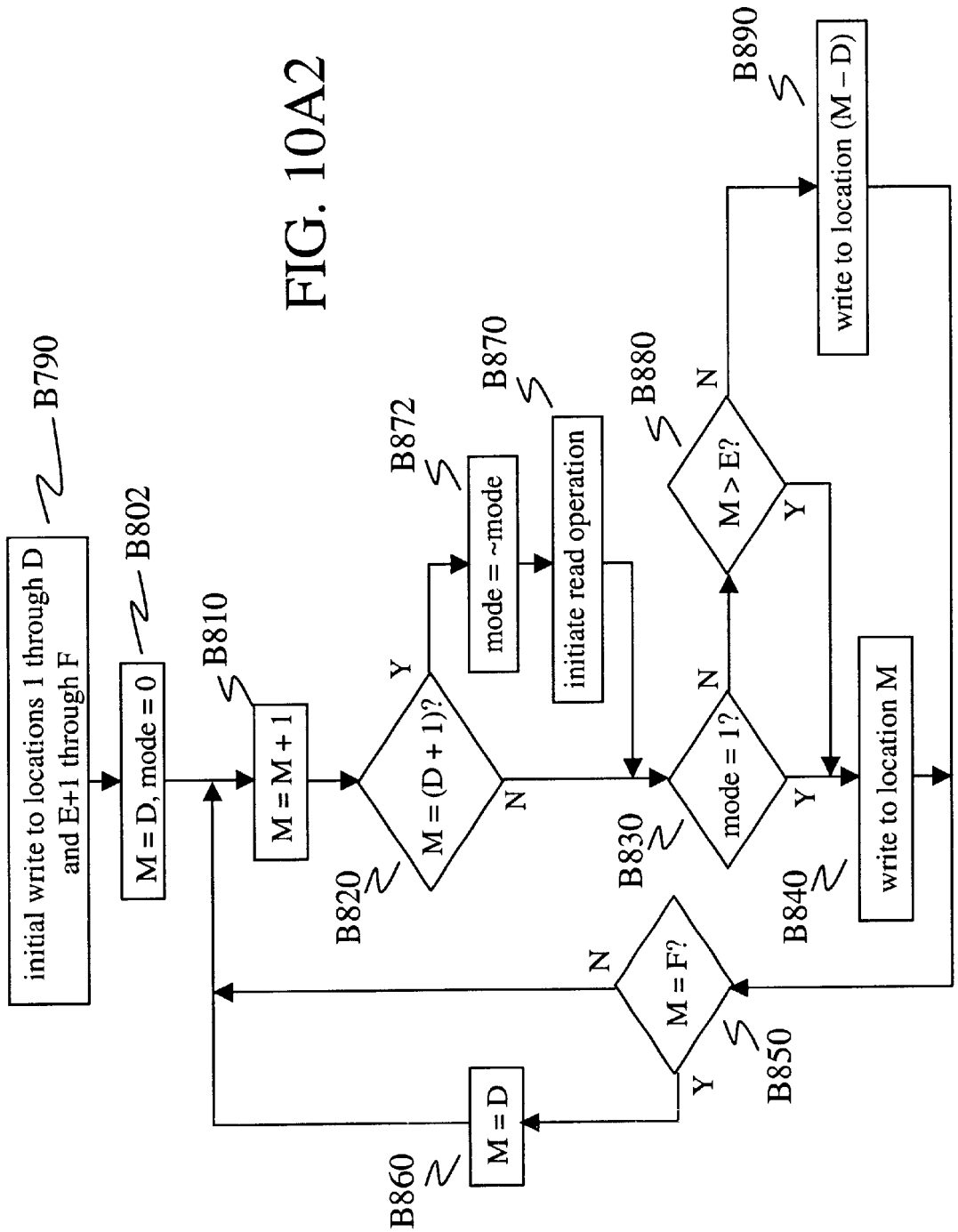
FIG. 10A2

METHOD AND APPARATUS FOR BUFFERING DATA TRANSMISSION BETWEEN PRODUCER AND CONSUMER

RELATED APPLICATIONS

The present application claims priority of U.S. patent application Ser. No. 09/406,173 filed Sep. 23, 1999 entitled "Method and Apparatus for Buffering Data Transmission Between Produce and Consumer," incorporated herein by reference.

BACKGROUND OF THE INVENTION

1. Field of the Invention

This invention relates to digital signal processing. Specifically, this invention relates to data buffering.

2. Description of Related Art and General Background

As shown in FIG. 1, a data path within a digital processing system or circuit may comprise several stages, wherein each stage may be characterized as a data producer and/or as a data consumer. In this example, stage 10 consumes data signals 40 and 80 and produces data signal 50, stage 20 consumes data signal 50 and produces data signals 60 and 90, and stage 30 consumes data signal 60 and produces data signal 70. Stage 15 is exclusively a data producer (for example, a read-only memory) and produces data signal 80, and stage 25 is exclusively a data consumer (for example, a display module) and consumes data signal 90.

Each such stage may be implemented in hardware and/or in software and may be defined, for example, as a portion or the entirety of a component, a circuit, a device, a process, a module, or a thread. The various stages in a data path may be a part of the same circuit or program, or they may be at opposite ends of a communications or storage application. Stages may also be defined at various levels of resolution, and a stage as defined at one level may comprise a collection of stages as defined at another level. The transmission of data between stages generally occurs along serial and/or parallel signal lines or channels.

A need often arises for the storage of data between two stages. For example, a differential may exist between the time that a data-producing stage (i.e. a producer) produces a quantity of data and the time that a data-consuming stage (i.e. a consumer) consumes that quantity of data. Data passing between such coupled stages are transitory, being defined only over some duration of time. If the data are not consumed before a new quantity of data is produced (or before control of the data signal line or channel is released), they may be lost.

Typically, the periphery of a data path is occupied by stages whose rates of data input or output are strictly defined by requirements of physical devices (e.g., devices for video or audio recording or presentation) or standards requirements (e.g., for modems or other communications controllers). Behind these peripheral stages are one or more processing stages which may be constrained to produce or consume data at different rates than those of the peripheral stages. In order to prevent a data loss resulting from the rate mismatch, it may be necessary to provide data storage between the peripheral and processing stages.

For example, data rate mismatches may arise within systems for digital communications. Certain stages of such an application may produce or consume data at a constant, uniform rate (e.g., sampling of an analog speech signal or the modulation or demodulation of a signal), while other stages may alternate between data processing and data input/output, thereby exhibiting data rates that are not constant over time (e.g., block-based processes such as error correction coding/decoding and block interleaving/deinterleaving). Although the average rates of production and consumption may be equal, the difference between the short-term characteristics of the rates may result in data loss if the two stages are connected directly. In order to reconcile the disparity between production and consumption when a constant-rate stage is data-coupled to a stage operating under a non-constant rate, some form of intermediate storage or buffering may be required.

One buffering scheme that may be used is the double buffer. In one implementation of a double buffer as shown in FIG. 2, data is alternately stored into one of two storage units 120 and 130 while previously stored data is retrieved from the other storage unit. The combination of demultiplexer 100, multiplexer 110, and inverter 140 operate under the direction of clock signal 150, directing input data signal 160 into one storage unit while producing output data signal 170 from data outputted by the other storage unit. In this manner, a constant input and/or output data rate may be maintained as desired. The size of the storage units 120 and 130 and the frequency of clock signal 150 are determined by factors such as the rates of the input and output data signals 160 and 170.

While double buffering techniques may be used to solve problems of data rate mismatches, however, cost and space considerations arise in connection with their implementation. Circuit elements for data storage are expensive in terms of area occupied. If a particular application requires a large amount of buffer capacity between two stages, then a significant amount of the available circuit area may be consumed by data storage. If the buffer area required by a proposed design can be reduced, on the other hand, it may be possible to reduce the total circuit size as well. Unfortunately, the minimum buffer capacity is typically dictated by other constraints such as processing block size and relative rates of data production and consumption.

SUMMARY

A novel apparatus is disclosed which comprises (1) control logic and (2) data storage having three portions. The control logic causes a first part of a data block to be stored in the first portion of the data storage and the remainder of the data block to be stored in the second portion of the data storage.

Over some period of time, the control logic causes the remainder of the data block to be retrieved from the data storage. During the same period, the control logic causes a second data block to be stored into the data storage, such that the first part of the second data block is stored in the first portion of the data storage and the remainder of the second data block is stored in the third portion of the data storage.

BRIEF DESCRIPTION OF THE DRAWINGS

FIG. 6A1 is a flow diagram of the method according to the second embodiment of the invention.

FIG. 6A2 is an alternative arrangement of the method according to the second embodiment.

FIG. 10A1 is a flow diagram of the method according to the fourth embodiment of the invention.

FIG. 10A2 is an alternative arrangement of the method according to the fourth embodiment.

DETAILED DESCRIPTION

First and Second Embodiments

Figure 3:
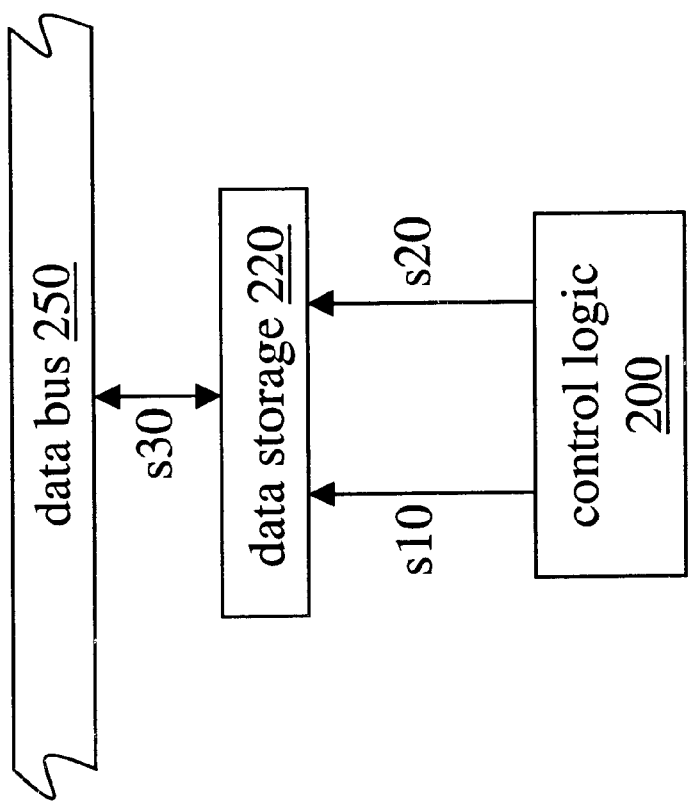
FIG. 3 is a block diagram of an apparatus according to the first embodiment of the invention.

FIG. 3 presents an overview of an apparatus according to the first embodiment of the invention. Control logic 200 generates an address signal s10 and a control signal s20 to data storage 220, which may comprise a semiconductor, magnetic, or flash memory unit or any other addressable storage medium or direct access storage device (DASD) having both read and write capability. Data storage 220 comprises a number of storage locations, and signals s10 and s20 indicate, respectively, which location to access and whether this access is to read or to write. Depending on the state of control signal s20, data storage 220 either outputs an item of data to data bus 250 over signal s30 or receives an item of data from data bus 250 over signal s30.

Figure 4:
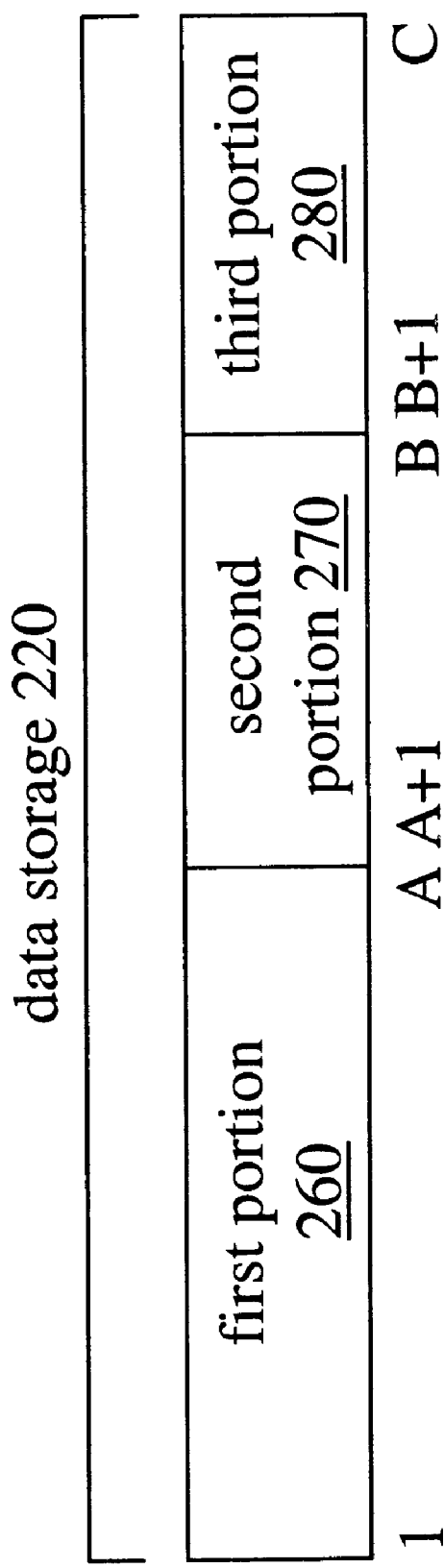
FIG. 4 is a block diagram showing a partition of the storage locations of data storage 220 into three portions.

As shown in FIG. 4, the storage locations within data storage 220 are divided into three portions. A first portion 260 comprises those locations having the lowest A addresses within data storage 220, designated herein as the range of addresses from 1 to A. (Note that the first location may actually be designated to have an address or offset of 0 depending upon the particular application, and that the convention of designating this location to have an address of 1 is adopted herein merely for convenience of exposition.) A second portion 270 comprises those locations having addresses in a range from (A+1) to B, and a third portion 280 comprises those locations having addresses in a range from (B+1) to C. The predetermined values of A, B, and C are discussed below.

In an exemplary application, the first through third portions are represented by consecutive sections of a single one-dimensional memory space. However, such constraints are not required in order to practice this embodiment of the invention.

Figure 5:
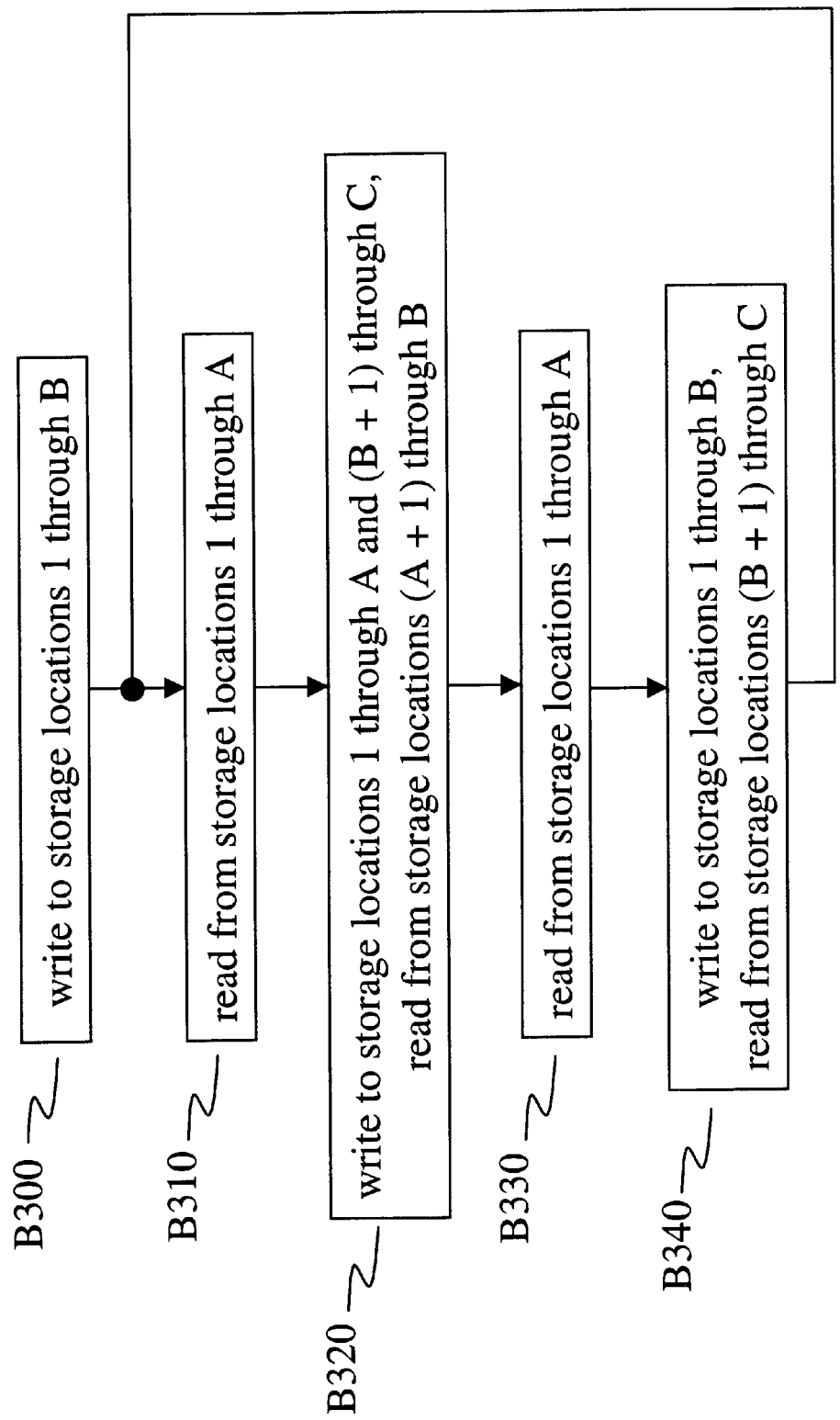
FIG. 5 is a description of the operation of the apparatus of FIG. 3.

FIG. 5 presents a description of the operation of the apparatus of FIG. 3. In block B300, data storage 220 is initialized by writing data to the first and second portions 260 and 270 (i.e. locations 1 through B). In block B310, the data stored in the first portion 260 (i.e. locations 1 through A) is outputted over signal s30. In block B320, the read operation continues into the second portion 270 of data storage 220 (i.e. locations (A+1) through B), while at the same time new data is written into the first and third portions 260 and 280 (i.e. locations 1 through A and (B+1) through C). In block B330, the data stored in the first portion 260 is outputted over signal s30. In block B340, the read operation continues into the third portion 280 of data storage 220 (i.e. locations (B+1) through C), while at the same time new data is written into the first and second portions 260 and 270 (i.e. locations 1 through B). The operation returns to block B310 to repeat in loop fashion as long as desired.

As implied in the above description, the values of A, B, and C are chosen to satisfy two criteria. First, the second and third portions 270 and 280 of data storage 220 are of equal size (i.e. B−A=C−B). Second, the total time required to write data to the first and second (third) portions 260 and 270 (280) is no greater than the time required to read data from the third (second) portion 280 (270). For a block-based application such as coding/decoding or interleaving/deinterleaving, the value of B may be set equal to the size of a block, and the value of A will be influenced by factors such as the relative speeds at which the read and write operations execute.

Figure 1:
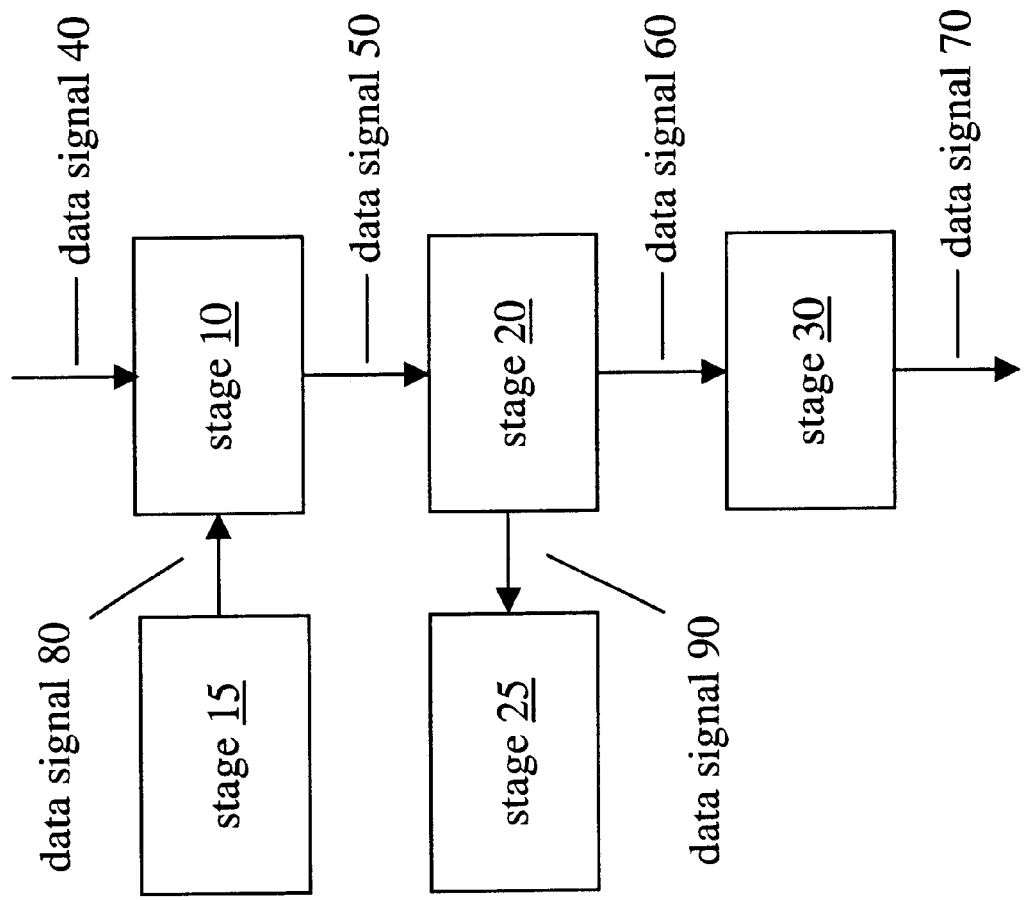
FIG. 1 is an illustration of a prior art data path in a digital signal processing system or circuit comprising several stages.
Figure 6B:
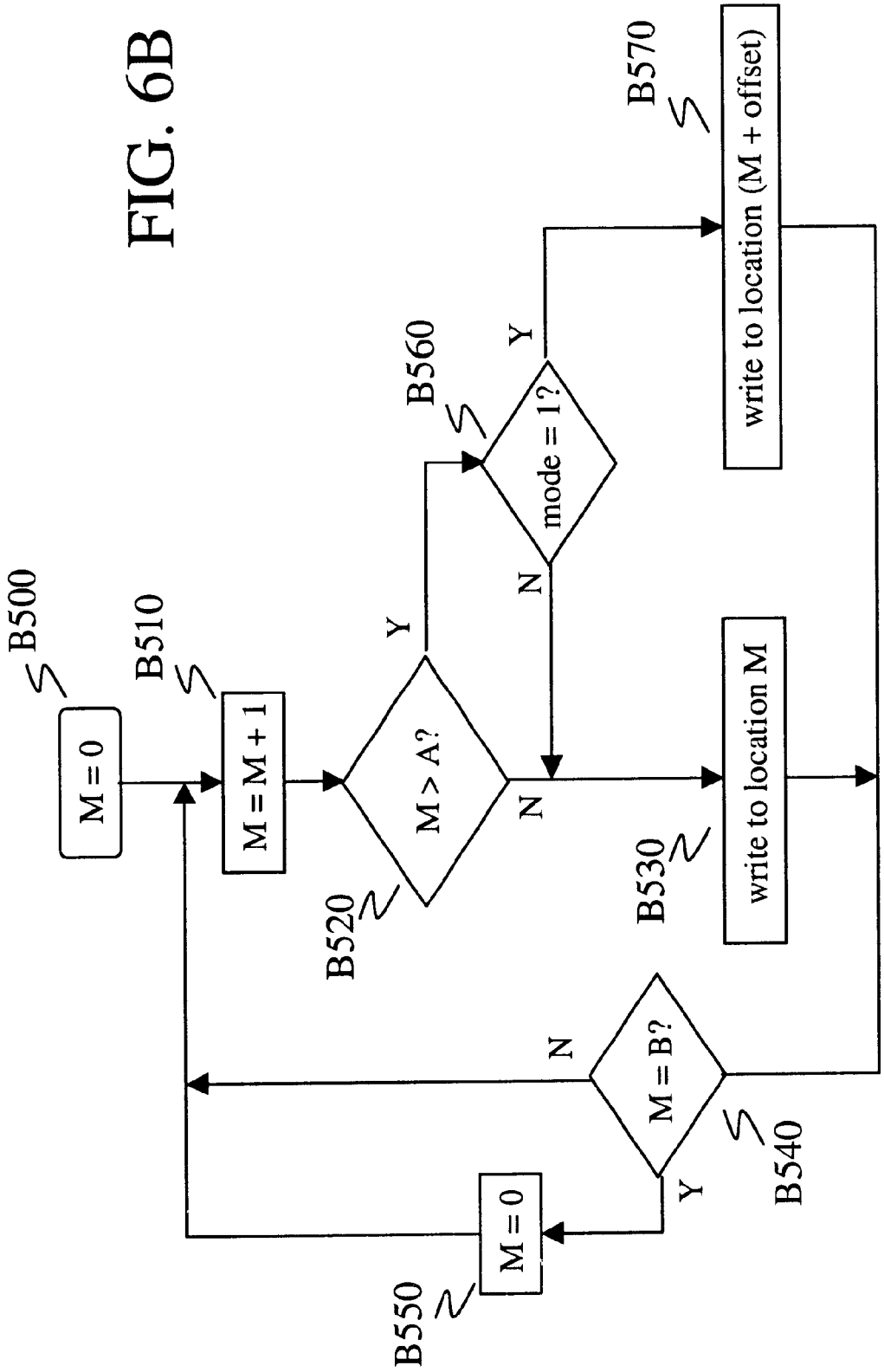
FIG. 6B is a flow diagram of the write burst operation of the method according to the second embodiment.

FIG. 6A1 shows a method according to a second embodiment of the invention, which may be used with any storage device having C locations with read and write access, and where the values A, B, and C are as defined above. In block B390, an initial writing of data to locations 1 through B is performed. In block B400, a read address counter N is initialized to zero, and the state of a binary flag 'mode' is initialized to 1 (i.e. ON, as opposed to 0 or OFF). The binary flag 'mode' may be implemented, for example, as a flip-flop or equivalent storage element, or in software, for example, as a Boolean variable. In block B410, the value of read address counter N is incremented. In block B420, the value of read address counter N is compared to the quantity (A+1). If the two quantities are equal, then a write operation as described in FIG. 6B is initiated.

In block B430, the state of binary flag 'mode' is tested. If the flag is set (i.e. has a value of 1), then data is read from the location indicated by the current value of read address counter N. If the flag 'mode' is not set (i.e. has a value of 0), then the value of read address counter N is compared to the value of A. If N is greater than A, then data is read from the location indicated by the quantity (N+offset), where the value of the offset is equal to the quantity (B−A). Note that the value A is analogous to the size of the first portion 260 in FIG. 4, and that the quantity (B−A) is analogous to the size of each of the second and third portions 270 and 280 in that figure. In blocks B450 and B460, the value of read address counter N is reset to zero if it has reached the value B, and in block B465, the state of binary flag 'mode' is inverted (i.e. changed from 1 to 0 or from 0 to 1).

Figure 2:
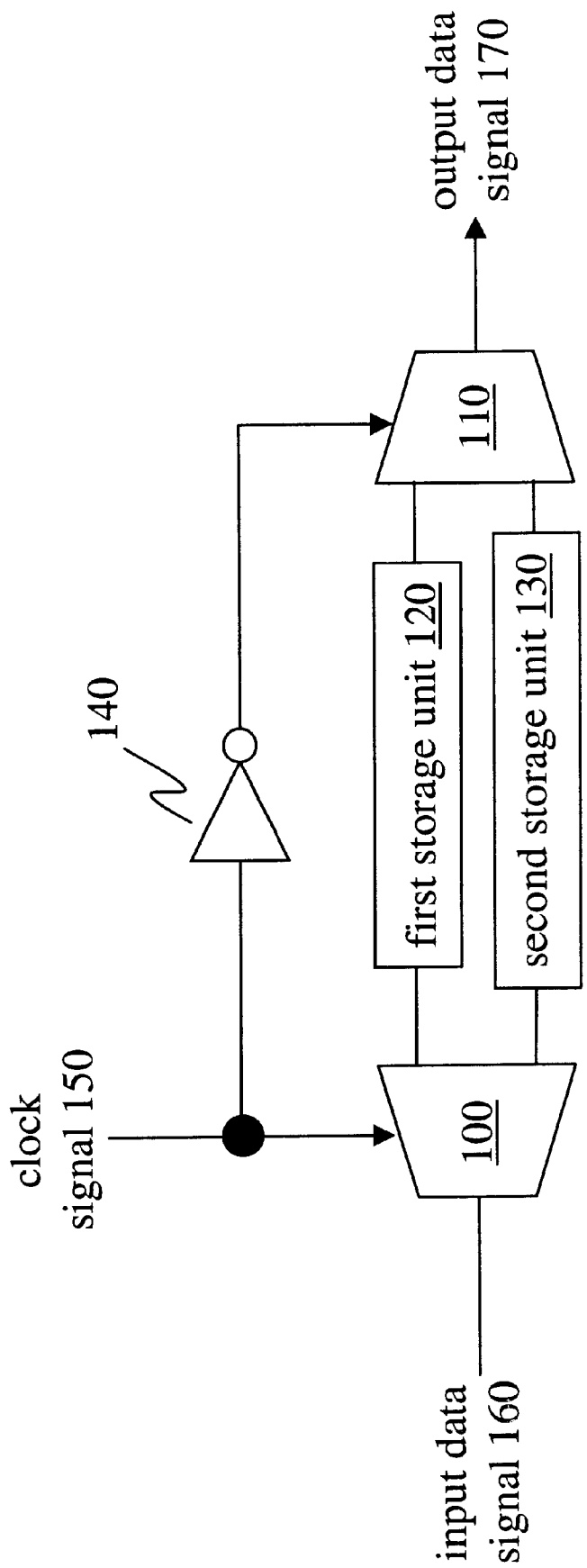
FIG. 2 is a block diagram of a prior art double buffer.

In FIG. 6A2, the initialization and toggling of binary flag 'mode' in the arrangement of FIG. 6A1 have been altered to produce a different but equivalent arrangement of the method according to the second embodiment. Specifically, block B400 has been changed to produce block B402, block B472 has been added, and block B465 has been omitted (i.e. short-circuited). Many other similarly equivalent expressions of this method are possible.

FIG. 6B describes a write operation suitable for use with the method of FIG. 6A1 or FIG. 6A2. In block B500, a write address counter M is initialized to zero. In block B510, the value of write address counter M is incremented. In block B520, the value of write address counter M is compared to the value of A. If the test fails (i.e. if M is not greater than A), then data is written to the location indicated by the current value of write address counter M in block B530. If the test succeeds (i.e. if M is greater than A), then the value of binary flag 'mode' is tested in block B560. If this flag has been set (i.e. by blocks B400 or B465 in FIG. 6A1 or by block B472 in FIG. 6A2), then data is written to the location indicated by the quantity (M+offset) in block B570, where the value of the offset is as defined above with respect to block B490 in FIG. 6A. In blocks B540 and B550, the value of write address counter M is reset to zero if it has reached the value B.

Third and Fourth Embodiments

Figure 7:
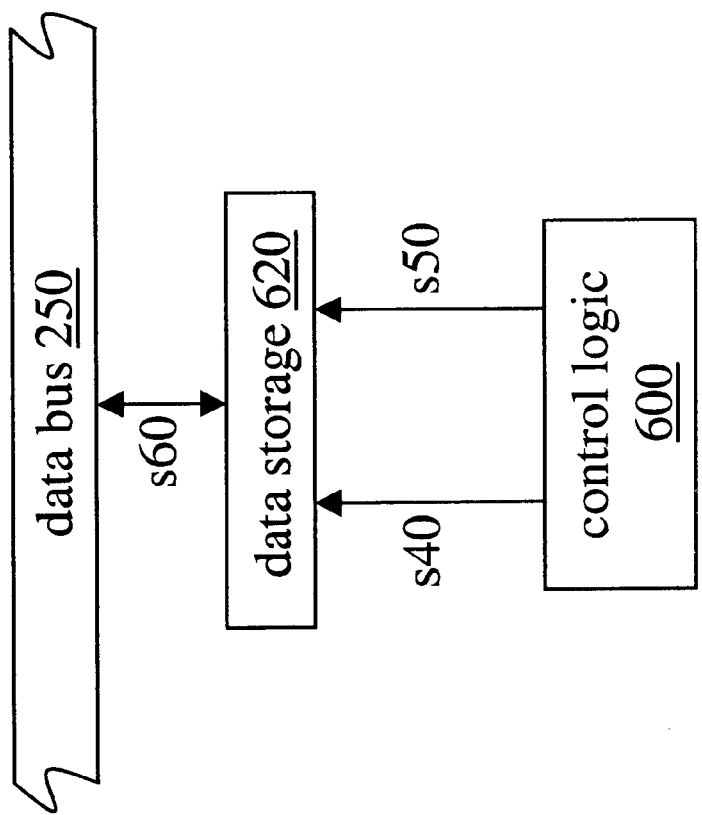
FIG. 7 is a block diagram of an apparatus according to the third embodiment of the invention.

FIG. 7 presents an overview of an apparatus according to the third embodiment of the invention. Control logic 600 generates an address signal s40 and a control signal s50 to data storage 620, which may comprise a semiconductor, magnetic, or flash memory unit or any other addressable storage medium or DASD having both read and write capability. Data storage 620 comprises a number of storage locations, and signals s40 and s50 indicate, respectively, which location to access and whether this access is to read or to write. Depending on the state of control signal s40, data storage 620 either outputs an item of data to data bus 250 over signal s60 or receives an item of data from data bus 250 over signal s60.

Figure 8:
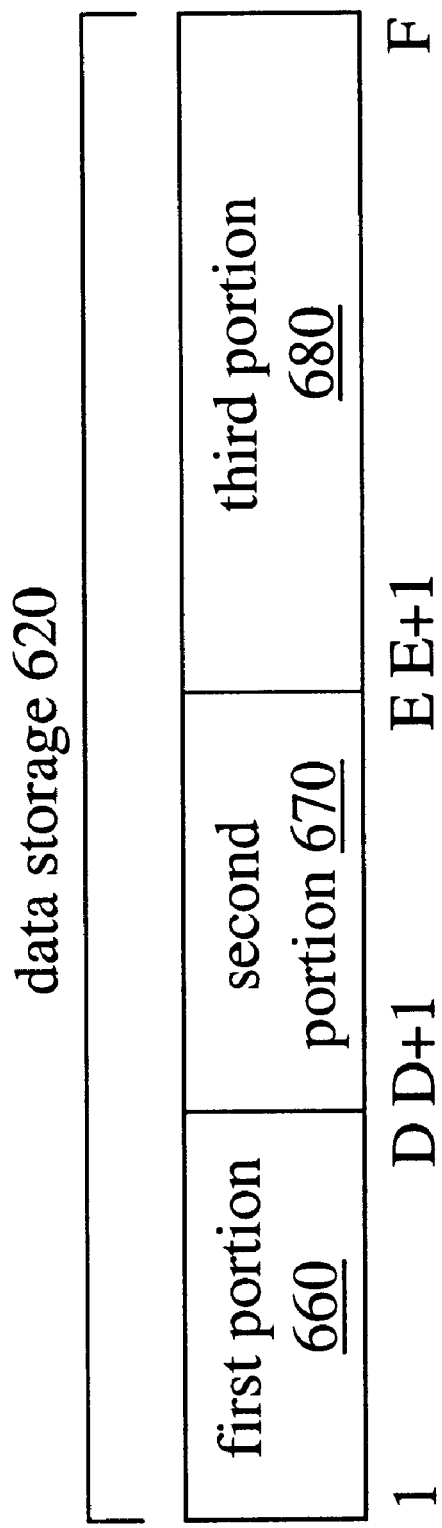
FIG. 8 is a block diagram showing a partition of the storage locations of data storage 620 into three portions.

As shown in FIG. 8, the storage locations within data storage 620 are divided into three portions. A first portion 660 comprises those locations having the lowest D addresses within data storage 620, designated herein as the range of addresses from 1 to D. (Note that the first location may actually be designated to have an address or offset of 0 depending upon the particular application, and that the convention of designating this location to have an address of 1 is adopted herein merely for convenience of exposition.) A second portion 670 comprises those locations having addresses in a range from (D+1) to E, and a third portion 680 comprises those locations having addresses in a range from (E+1) to F. The predetermined values of D, E, and F are discussed below.

In an exemplary application, the first through third portions are represented by consecutive sections of a single one-dimensional memory space. However, such constraints are not required in order to practice this embodiment of the invention.

Figure 9:
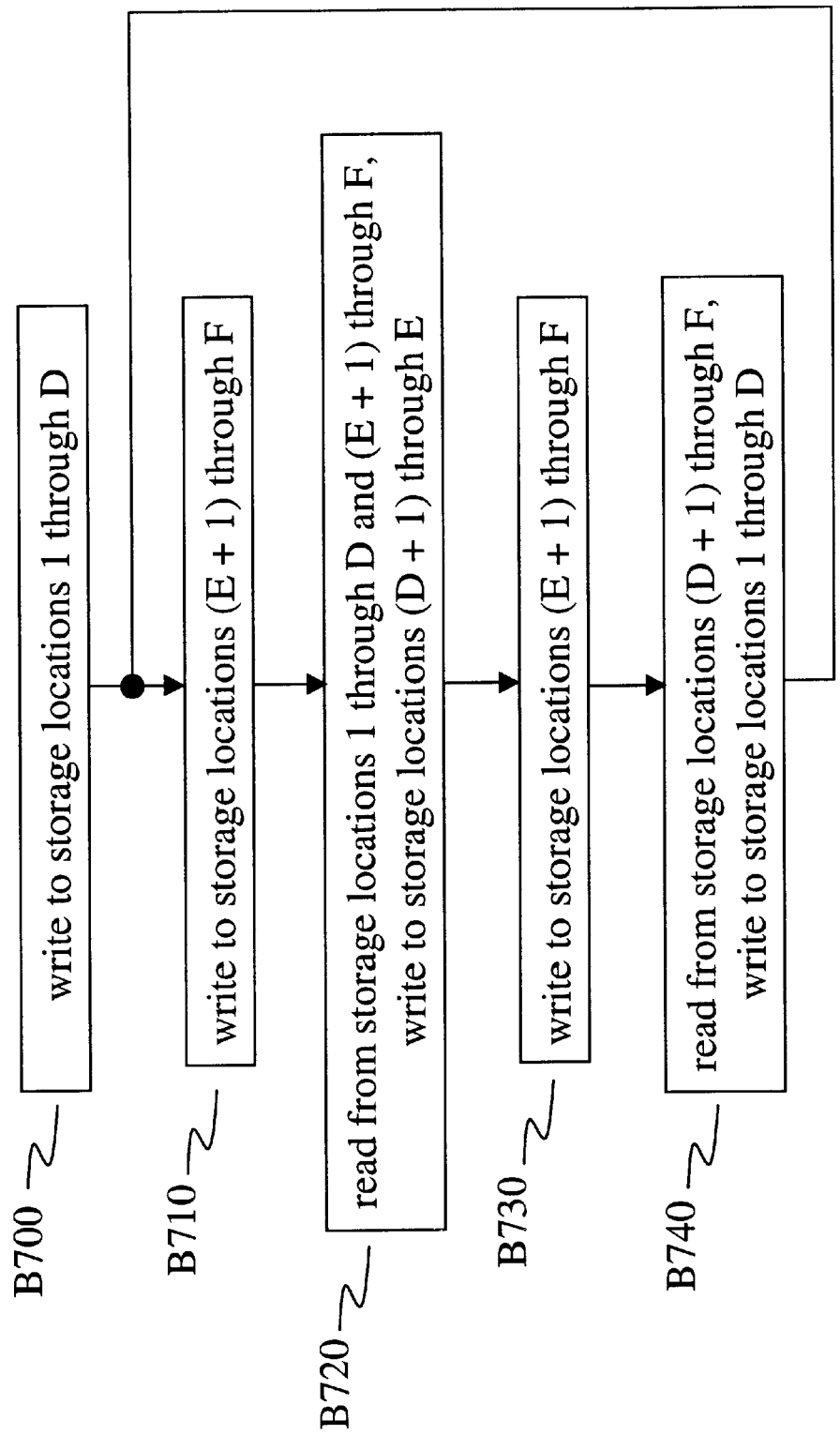
FIG. 9 is a description of the operation of the apparatus of FIG. 7.

FIG. 9 presents a description of the operation of the apparatus of FIG. 7. In block B700, data storage 620 is initialized by writing data to the first portion 660 (i.e. locations 1 through D). In block B710, data is stored in the third portion 680 (i.e. locations (E+1) through F). In block B720, the data stored in the first and third portions 660 and 680 is outputted over signal s60, while at the same time data is written into the second portion 670 (i.e. locations (D+1) through E). In block B730, data is stored in the third portion 680 (i.e. locations (E+1) through F). In block B740, the data stored in the second and third portions 670 and 680 is outputted over signal s60, while at the same time data is written into the first portion 660 (i.e. locations 1 through D). The operation returns to block B710 to repeat in loop fashion as long as desired.

As implied in the above description, the values of D, E, and F are chosen to satisfy two criteria. First, the first and second portions 660 and 670 of data storage 620 are of equal size (i.e. E=2×D). Second, the total time required to read data from the first (second) and third portions 660 (670) and 680 is no greater than the time required to write data to the second (first) portion 670 (660). For a block-based application such as coding/decoding or interleaving/deinterleaving, the quantity F−D may be set equal to the size of a block, and the value of D will be influenced by factors such as the relative speeds at which the read and write operations execute.

Figure 10B:
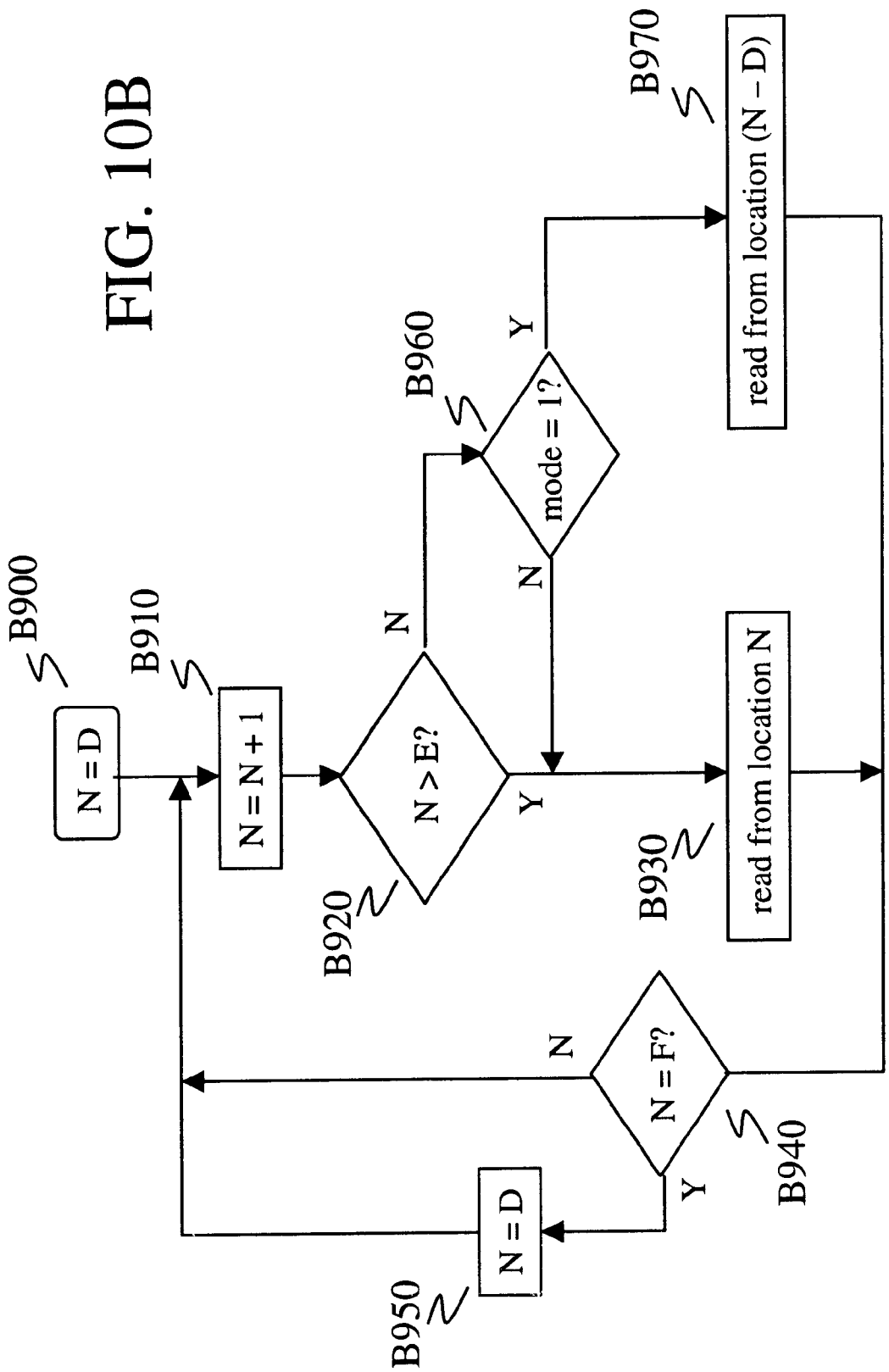
FIG. 10B is a flow diagram of the read burst operation of the method according to the fourth embodiment.

FIG. 10A1 shows a method according to a fourth embodiment of the invention, which may be used with any storage device having F locations with read and write access, and where the values D, E, and F are as defined above. In block B790, an initial writing of data to locations 1 through D and E+1 through F is performed. In block B800, a write address counter M is initialized to the value D, and the state of a binary flag 'mode' is initialized to 1 (i.e. ON, as opposed to 0 or OFF). The binary flag 'mode' may be implemented, for example, as a flip-flop or equivalent storage element, or in software, for example, as a Boolean variable. In block B810, the value of write address counter M is incremented. In block B820, the value of write address counter M is compared to the quantity (D+1). If the two values are equal, then a read operation as described in FIG. 10B is initiated.

In block B830, the state of binary flag 'mode' is tested. If the flag is set (i.e. has a value of 1), then data is read from the location indicated by the current value of write address counter M. If the flag 'mode' is not set (i.e. has a value of 0), then the value of write address counter M is compared to the value of E. If M is greater than E, then data is written to the location indicated by the quantity (M−D). Note that the value D is analogous to the size of each of the first and second portions 660 and 670 in FIG. 8, and that the quantity (F−E) is analogous to the size of the third portion 660 in that figure. In blocks B850 and B860, the value of write address counter M is reset to the value D if it has reached the value F, and in block B865, the state of binary flag 'mode' is inverted (i.e. changed from 1 to 0 or from 0 to 1).

In FIG. 10A2, the initialization and toggling of binary flag 'mode' in the arrangement of FIG. 10A1 have been altered to produce a different but equivalent arrangement of the method according to the fourth embodiment. Specifically, block B800 has been changed to produce block B802, block B872 has been added, and block B865 has been omitted (i.e. short-circuited). Many other similarly equivalent expressions of this method are possible.

FIG. 10B describes a read operation suitable for use with the method of FIG. 10A1 or FIG. 10A2. In block B900, a read address counter N is initialized to the value D. In block B910, the value of read address counter N is incremented. In block B920, the value of read address counter N is compared to the value of E. If the test succeeds (i.e. if N is greater than E), then data is written to the location indicated by the current value of read address counter N in block B930. If the test fails (i.e. if N is not greater than E), then the value of binary flag 'mode' is tested in block B960. If this flag has been set (i.e. by block B870 in FIG. 10A1 or block B972 in FIG. 10A2), then data is written to the location indicated by the quantity (N−D). In blocks B940 and B950, the value of read address counter N is reset to the value D if it has reached the value F.

A method or apparatus according to one among the disclosed embodiments or their equivalents may be used to advantage in any buffering application such as one involving interleaving or a rate mismatch. In particular, it is noted that such method or apparatus may be used in conjunction with the teachings of U.S. patent application Ser. No. 09/406,173, entitled "METHOD AND APPARATUS FOR INTERLEAVING FOR INFORMATION TRANSMISSION OR STORAGE APPLICATIONS," which application is assigned to the assignee of the present invention and is filed concurrently herewith and the disclosure of which application is hereby incorporated by reference.

The foregoing description of the disclosed embodiments is provided to enable any person skilled in the art to make or use the present invention. Various modifications to these embodiments are possible, and the generic principles presented herein may be applied to other embodiments. For example, the invention may be implemented in part or in whole as a hard-wired circuit, as a circuit configuration fabricated in an integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

We claim:

1. An apparatus comprising:

data storage having first, second, and third portions; and control logic, wherein said control logic causes said data storage to store a first part of a first data block in the first portion of said data storage and a remainder of the first data block in the second portion of said data storage, and wherein said control logic causes said data storage to retrieve the remainder of the first data block over a first period of time, and wherein said control logic causes said data storage to store, over a period of time concurrent to and not longer than the first period of time, a first part of a second data block in the first portion of said data storage and a remainder of the second data block in the third portion of said data storage.

2. The apparatus according to claim 1, wherein a data capacity of said second portion is equal to a data capacity of said third portion.

3. The apparatus according to claim 1, wherein said control logic comprises at least one counter.

4. The apparatus according to claim 1, wherein said data storage receives an address signal and a control signal from said control logic, and wherein said address signal indicates a storage location within said data storage, and wherein said control signal indicates whether an access to said indicated storage location shall be for reading or for writing.

5. The apparatus according to claim 1, wherein a data set comprising at least a portion of the first data block and at least a portion of the second data block is retrieved from said data storage at a data rate which is substantially constant over time.

6. The apparatus according to claim 1, wherein the first part of the first data block is the same size as the first part of the second data block.

7. The apparatus according to claim 1, wherein the total size of the first, second, and third portions is less than twice the size of the first data block.

8. The apparatus according to claim 1, wherein said control logic and said data storage are fabricated in the same integrated circuit.

9. An apparatus comprising:

data storage having first, second, and third portions; and control logic, wherein said control logic causes said data storage to store a first part of a first data block in the first portion of said data storage and a remainder of the first data block in the third portion of said data storage, and wherein said control logic causes said data storage to store a first part of a second data block in the second portion of said data storage during a first period of time, and wherein said control logic causes said data storage to retrieve, during a period of time concurrent to and not longer than the first period of time, the first part of the first data block from the first portion of said data storage and the remainder of the first data block from the third portion of said data storage.

10. The apparatus according to claim 9, wherein a data capacity of said second portion is equal to a data capacity of said first portion.

11. The apparatus according to claim 9, wherein said control logic comprises at least one counter.

12. The apparatus according to claim 9, wherein said data storage receives an address signal and a control signal from said control logic, and wherein said address signal indicates a storage location within said data storage, and wherein said control signal indicates whether an access to said indicated storage location shall be for reading or for writing.

13. The apparatus according to claim 9, a data set comprising at least a portion of the first data block and at least a portion of the second data block is stored in said data storage at a data rate which is substantially constant over time.

14. The apparatus according to claim 9, wherein the first part of the first data block is the same size as the first part of the second data block.

15. The apparatus according to claim 9, wherein the total size of the first, second, and third portions is less than twice the size of the first data block.

16. The apparatus according to claim 9, wherein said control logic and said data storage are fabricated in the same integrated circuit.

17. A method comprising:

storing a first part of a first block of data into a first portion of data storage;

storing a second part of the first block of data into a second portion of the data storage; and storing a first part of a second block of data into the first portion of the data storage, and storing a second part of the second block of data into a third portion of the data storage, while retrieving the second part of the first block of data from the second portion of the data storage.

18. The method according to claim 17, wherein a data capacity of said second portion is equal to a data capacity of said third portion.

19. The method according to claim 17, a data set comprising at least a portion of the first data block and at least a portion of the second data block is retrieved from said data storage at a data rate which is substantially constant over time.

20. The apparatus according to claim 17, wherein the first part of the first data block is the same size as the first part of the second data block.

21. The apparatus according to claim 17, wherein the total size of the first, second, and third portions is less than twice the size of the first data block.

22. A method comprising:

storing a first part of a first block of data into a first portion of data storage;

storing a second part of the first block of data into a second portion of the data storage; and storing a first part of a second block of data into the first portion of the data storage, and storing a second part of the second block of data into a third portion of the data storage, while retrieving the second part of the first block of data from the second portion of the data storage.

23. The method according to claim 22, wherein a data capacity of said second portion is equal to a data capacity of said first portion.

24. The method according to claim 22, wherein a data set comprising at least a portion of the first data block and at least a portion of the second data block is stored in said data storage at a data rate which is substantially constant over time.

25. The apparatus according to claim 22, wherein the first part of the first data block is the same size as the first part of the second data block.

26. The apparatus according to claim 22, wherein the total size of the first, second, and third portions is less than twice the size of the first data block.

27. A data storage medium having machine-readable code stored thereon, the machine-readable code comprising instructions executable by an array of logic elements, the instructions defining a method comprising:

storing a first part of a first block of data into a first portion of data storage;

storing a second part of the first block of data into a second portion of the data storage; and storing a first part of a second block of data into the first portion of the data storage, and storing a second part of the second block of data into a third portion of the data storage, while retrieving the second part of the first block of data from the second portion of the data storage.

28. The method according to claim 27, wherein a data capacity of said second portion is equal to a data capacity of said third portion.

29. The method according to claim 27, wherein a data set comprising at least a portion of the first data block and at least a portion of the second data block is retrieved from said data storage at a data rate which is substantially constant over time.

30. The apparatus according to claim 27, wherein the first part of the first data block is the same size as the first part of the second data block.

31. The apparatus according to claim 27, wherein the total size of the first, second, and third portions is less than twice the size of the first data block.

* * * * *